US012170849B2

(12) United States Patent
Schlezinger

(10) Patent No.: US 12,170,849 B2
(45) Date of Patent: Dec. 17, 2024

(54) PULSED ILLUMINATION FOR FLUID INSPECTION

(71) Applicant: Applied Materials, Inc., Santa Clara, CA (US)

(72) Inventor: Asaf Schlezinger, Modi'in (IL)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 17/650,024

(22) Filed: Feb. 4, 2022

(65) Prior Publication Data

US 2023/0254589 A1    Aug. 10, 2023

(51) Int. Cl.
| | |
|---|---|
| *H04N 23/74* | (2023.01) |
| *B65G 47/22* | (2006.01) |
| *G06T 7/00* | (2017.01) |
| *H04N 7/015* | (2006.01) |
| *H04N 23/56* | (2023.01) |

(52) U.S. Cl.
CPC ............. *H04N 23/74* (2023.01); *G06T 7/001* (2013.01); *H04N 7/015* (2013.01); *H04N 23/56* (2023.01); *B65G 47/22* (2013.01); *B65G 2201/0235* (2013.01); *G06T 2207/10152* (2013.01); *G06T 2207/30108* (2013.01)

(58) Field of Classification Search
CPC ........ H04N 23/74; H04N 7/015; H04N 23/56; G06T 7/001; G06T 2207/10152; G06T 2207/30108; B65G 47/22; B65G 2201/0235
See application file for complete search history.

(56) References Cited

U.S. PATENT DOCUMENTS

| | | |
|---|---|---|
| 6,275,603 B1 | 8/2001 | Cronshaw et al. |
| 6,901,726 B2 | 6/2005 | Huppi et al. |
| 7,412,813 B2 | 8/2008 | Heil et al. |
| 7,473,389 B2 | 1/2009 | Jaksztat et al. |

(Continued)

FOREIGN PATENT DOCUMENTS

| | | |
|---|---|---|
| AR | 045334 A1 | 10/2005 |
| AT | 307093 | 5/1973 |

(Continued)

OTHER PUBLICATIONS

U.S. Appl. No. 17/510,185, filed Oct. 25, 2021, entitled "Compact Apparatus for Batch Vial Inspection".

(Continued)

*Primary Examiner* — Nasim N Nirjhar
(74) *Attorney, Agent, or Firm* — Patterson + Sheridan, LLP

(57) ABSTRACT

Embodiments described herein provide for a method and system for the inspection of fluids for defects. A plurality of containers with fluids disposed therein are inspected for defects in an inspection system. A timing sequence is used to control the timing of light pulses directed to the fluid residing in the plurality of containers. A high-resolution camera is utilized to obtain images of the fluid disposed in the plurality of containers. An illumination time of pulses of light in the inspection zone is less than an exposure time of each frame of a plurality of frames of the high-resolution camera. As such, the inspection system and method of utilizing the inspection system allows for high-resolution images of the fluid to be captured without smearing of the defects in the captured images.

19 Claims, 6 Drawing Sheets

(56) References Cited

U.S. PATENT DOCUMENTS

| | | |
|---|---|---|
| 7,560,720 B2 | 7/2009 | Voigt et al. |
| 7,674,424 B2 | 3/2010 | Baumgarte et al. |
| 7,695,616 B2 | 4/2010 | Corrado |
| 7,789,655 B2 | 9/2010 | Klatt et al. |
| 7,790,097 B2 | 9/2010 | Litzenberg et al. |
| 7,871,259 B2 | 1/2011 | Linke et al. |
| 7,879,234 B2 | 2/2011 | Barani |
| 7,887,742 B2 | 2/2011 | Linke et al. |
| 7,887,743 B2 | 2/2011 | Linke et al. |
| 7,959,850 B2 | 6/2011 | Jaksztat et al. |
| 8,029,270 B2 | 10/2011 | Baumgarte et al. |
| 8,038,429 B2 | 10/2011 | Linke et al. |
| 8,092,741 B2 | 1/2012 | Barani |
| 8,167,607 B2 | 5/2012 | Linke et al. |
| 8,202,079 B2 | 6/2012 | Litzenberg et al. |
| 8,354,054 B2 | 1/2013 | Haesendonckx et al. |
| 8,574,486 B2 | 11/2013 | Jaksztat et al. |
| 8,871,137 B2 | 10/2014 | Consolaro et al. |
| 8,978,344 B2 | 3/2015 | Krauss et al. |
| 8,980,162 B2 | 3/2015 | Haesendonckx et al. |
| 9,511,559 B2 | 12/2016 | Wolters et al. |
| 9,676,564 B2 | 6/2017 | Kawahara et al. |
| 9,745,146 B2 | 8/2017 | Schaeuble |
| 9,965,840 B2 | 5/2018 | Maga et al. |
| 9,975,685 B2 | 5/2018 | Wolters et al. |
| 10,399,736 B2 | 9/2019 | Duisken et al. |
| 10,408,766 B2 | 9/2019 | Okada et al. |
| 10,543,665 B2 | 1/2020 | Alef et al. |
| 10,545,068 B2 | 1/2020 | Maurischat |
| 10,625,488 B2 | 4/2020 | Alef et al. |
| 10,647,511 B2 | 5/2020 | Baumgartner et al. |
| 10,751,989 B2 | 8/2020 | Gregor et al. |
| 11,065,824 B2 | 7/2021 | Alef et al. |
| 11,117,341 B2 | 9/2021 | Alef et al. |
| 11,117,689 B2 | 9/2021 | Dahlmanns et al. |
| 11,275,033 B2 | 3/2022 | Knuelle |
| 2005/0117149 A1 | 6/2005 | Grindinger et al. |
| 2005/0259860 A1 | 11/2005 | Lewin et al. |
| 2006/0121222 A1 | 6/2006 | Andrich et al. |
| 2008/0230720 A1 | 9/2008 | Nielsen |
| 2008/0256902 A1 | 10/2008 | Lorcks et al. |
| 2009/0146332 A1 | 6/2009 | Linke et al. |
| 2010/0078861 A1 | 4/2010 | Herklotz et al. |
| 2010/0182419 A1 | 7/2010 | Jiang |
| 2011/0233410 A1 | 9/2011 | Niedermeier |
| 2013/0167484 A1 | 7/2013 | Wolters et al. |
| 2013/0172164 A1 | 7/2013 | Wolters et al. |
| 2014/0015960 A1 | 1/2014 | Niedermeier |
| 2014/0163319 A1* | 6/2014 | Blanquart ............... H04N 25/63 600/109 |
| 2014/0223862 A1 | 8/2014 | Nicoletti et al. |
| 2015/0352820 A1 | 12/2015 | Duisken et al. |
| 2016/0214827 A1 | 7/2016 | Reichelt et al. |
| 2016/0251261 A1 | 9/2016 | Bureau |
| 2018/0140197 A1* | 5/2018 | Wang ..................... A61B 5/0077 |
| 2018/0290187 A1* | 10/2018 | Daniel ..................... B08B 9/423 |
| 2019/0009961 A1 | 1/2019 | Ochsmann et al. |
| 2019/0016094 A1 | 1/2019 | Ochsmann et al. |
| 2019/0197294 A1* | 6/2019 | Demirci ............. G01N 15/1475 |
| 2020/0147927 A1 | 5/2020 | Bothor et al. |
| 2020/0234236 A1 | 7/2020 | Bureau |
| 2020/0382721 A1* | 12/2020 | Harfouche ........... G01B 11/245 |
| 2020/0408702 A1 | 12/2020 | Knuelle |
| 2021/0213486 A1* | 7/2021 | Fradkin ................. G06V 10/774 |
| 2022/0057336 A1* | 2/2022 | Pearson ................. H04N 23/74 |
| 2022/0146437 A1* | 5/2022 | Yachida ............. G01N 21/9081 |
| 2022/0182556 A1* | 6/2022 | Pilloud ................ H04N 23/698 |
| 2022/0212818 A1 | 7/2022 | Schwandt et al. |
| 2023/0127203 A1 | 4/2023 | Schlezinger |

FOREIGN PATENT DOCUMENTS

| | | |
|---|---|---|
| AT | 326331 | 12/1975 |
| AT | 327089 | 1/1976 |
| AT | 332840 | 10/1976 |
| AT | 344180 B | 7/1978 |
| AT | 358010 B | 8/1980 |
| AT | 359166 B | 10/1980 |
| AT | 359168 B | 10/1980 |
| AT | 374099 B | 3/1984 |
| AT | 374317 B | 4/1984 |
| AT | 376921 B | 1/1985 |
| AT | 410291 B | 3/2003 |
| AT | 508282 A2 | 12/2010 |
| AT | 510787 A1 | 6/2012 |
| AT | 510677 B1 | 7/2016 |
| AT | 524294 | 4/2022 |
| AT | 524295 A2 | 4/2022 |
| AU | 2002236198 A1 | 9/2003 |
| AU | 2003266128 A1 | 3/2004 |
| AU | 2003264329 A1 | 4/2004 |
| AU | 2014210176 A1 | 7/2015 |
| AU | 2013301873 B2 | 9/2016 |
| AU | 2015340773 A1 | 4/2017 |
| AU | 2015340774 A1 | 4/2017 |
| AU | 2017269485 A1 | 11/2018 |
| AU | 2017270119 A1 | 11/2018 |
| AU | 2017318326 A1 | 3/2019 |
| AU | 2017333936 A1 | 3/2019 |
| AU | 2018298842 A1 | 1/2020 |
| BR | 112012018627 A2 | 5/2016 |
| BR | 112015017637 A2 | 7/2017 |
| BR | 112017008961 A2 | 12/2017 |
| BR | 112017008802 A2 | 6/2018 |
| BR | 112018013116 A2 | 12/2018 |
| BR | 112018013137 A2 | 12/2018 |
| BR | 112018072964 A2 | 2/2019 |
| BR | 112018074371 A2 | 3/2019 |
| BR | 112019004130 A2 | 5/2019 |
| BR | 112019006548 A2 | 6/2019 |
| BR | 112013001033 A2 | 9/2019 |
| BR | 112012018628 B1 | 12/2019 |
| BR | 112012018621 B1 | 2/2020 |
| BR | 112012018624 B1 | 4/2020 |
| BR | 112013002711 B1 | 4/2020 |
| BR | PI1010724 B1 | 4/2020 |
| BR | 112020000860 A2 | 10/2020 |
| BR | 112014029993 B1 | 1/2021 |
| BR | 112012018623 B1 | 6/2021 |
| BR | 112016010475 B1 | 7/2021 |
| CA | 2423949 C | 10/2011 |
| CA | 2804814 C | 11/2015 |
| CA | 2972667 A1 | 9/2016 |
| CA | 2578862 C | 7/2017 |
| CA | 2807172 C | 9/2019 |
| CA | 3129641 A1 | 8/2020 |
| CA | 3136505 A1 | 11/2020 |
| CN | 1756697 A | 4/2006 |
| CN | 101432121 A | 5/2009 |
| CN | 100493886 C | 6/2009 |
| CN | 101232988 B | 9/2010 |
| CN | 101061382 B | 1/2011 |
| CN | 101228020 B | 1/2011 |
| CN | 101142072 B | 5/2012 |
| CN | 101160201 B | 8/2012 |
| CN | 101415952 B | 8/2012 |
| CN | 101432122 B | 8/2012 |
| CN | 101500781 B | 3/2013 |
| CN | 103118945 A | 5/2013 |
| CN | 103171125 A | 6/2013 |
| CN | 102470933 B | 10/2013 |
| CN | 101394986 B | 11/2013 |
| CN | 102574324 B | 10/2014 |
| CN | 102725137 B | 11/2014 |
| CN | 101790450 B | 2/2015 |
| CN | 102781658 B | 7/2015 |
| CN | 102844174 B | 11/2015 |
| CN | 103209833 B | 11/2015 |
| CN | 102844173 B | 12/2015 |
| CN | 105473327 A | 4/2016 |
| CN | 102275734 B | 5/2016 |
| CN | 105745030 A | 7/2016 |
| CN | 104379349 B | 9/2016 |

(56) References Cited

FOREIGN PATENT DOCUMENTS

| | | | |
|---|---|---|---|
| CN | 102725136 B | 10/2016 |
| CN | 108027916 A | 5/2018 |
| CN | 106458471 B | 11/2018 |
| CN | 109249666 A | 1/2019 |
| CN | 109313142 A | 2/2019 |
| CN | 105593150 B | 4/2019 |
| CN | 106458358 B | 8/2019 |
| CN | 107209126 B | 11/2019 |
| CN | 106660649 B | 12/2019 |
| CN | 210148870 U | 3/2020 |
| CN | 107257917 B | 9/2020 |
| CN | 105365202 B | 10/2020 |
| CN | 111776473 A | 10/2020 |
| CN | 107073868 B | 11/2020 |
| CN | 212386955 U | 1/2021 |
| CN | 109689362 B | 3/2021 |
| CN | 106467179 B | 4/2021 |
| CN | 109195719 B | 4/2021 |
| CN | 109715373 B | 5/2021 |
| CN | 106066331 B | 6/2021 |
| CN | 108472931 B | 6/2021 |
| CN | 108792057 B | 6/2021 |
| CN | 107055073 B | 7/2021 |
| CN | 109195869 B | 8/2021 |
| CN | 108472925 B | 9/2021 |
| CN | 109196338 B | 9/2021 |
| CN | 113423644 A | 9/2021 |
| CN | 109195868 B | 11/2021 |
| CN | 113993787 A | 1/2022 |
| CN | 105745030 B | 4/2022 |
| CN | 109313142 B | 4/2022 |
| CN | 114424242 A | 4/2022 |
| DE | 10240252 A1 | 3/2004 |
| DE | 10242086 A1 | 4/2004 |
| DE | 10318556 A1 | 11/2004 |
| DE | 10325229 A1 | 12/2004 |
| DE | 10336788 A1 | 3/2005 |
| DE | 10339473 A1 | 3/2005 |
| DE | 10340915 A1 | 3/2005 |
| DE | 10340916 A1 | 3/2005 |
| DE | 10346089 A1 | 5/2005 |
| DE | 10354506 A1 | 6/2005 |
| DE | 10355365 A1 | 6/2005 |
| DE | 10357247 A1 | 7/2005 |
| DE | 102004003939 A1 | 8/2005 |
| DE | 102004008400 A1 | 9/2005 |
| DE | 102004008490 A1 | 9/2005 |
| DE | 202004006716 U1 | 9/2005 |
| DE | 102004012124 A1 | 10/2005 |
| DE | 102004018146 A1 | 10/2005 |
| DE | 102004024277 A1 | 12/2005 |
| DE | 102004034286 A1 | 2/2006 |
| DE | 102004044260 A1 | 4/2006 |
| DE | 102004045405 A1 | 4/2006 |
| DE | 102004050470 A1 | 4/2006 |
| DE | 102004050531 A1 | 4/2006 |
| DE | 202005020679 U1 | 6/2006 |
| DE | 60206805 T2 | 7/2006 |
| DE | 102005048358 A1 | 8/2006 |
| DE | 102005017540 A1 | 10/2006 |
| DE | 102005040905 A1 | 10/2006 |
| DE | 102006015475 A1 | 10/2006 |
| DE | 202005020967 U1 | 12/2006 |
| DE | 102005011805 A1 | 1/2007 |
| DE | 102005020716 A1 | 1/2007 |
| DE | 102005034541 A1 | 2/2007 |
| DE | 102005034846 A1 | 2/2007 |
| DE | 102005035233 A1 | 4/2007 |
| DE | 102005045942 A1 | 4/2007 |
| DE | 112005001462 A5 | 5/2007 |
| DE | 102005059057 A1 | 6/2007 |
| DE | 102006003142 A1 | 8/2007 |
| DE | 102006011137 A1 | 9/2007 |
| DE | 102006014389 A1 | 10/2007 |
| DE | 112006000799 A5 | 1/2008 |
| DE | 112006000800 A5 | 1/2008 |
| DE | 102006032140 A1 | 2/2008 |
| DE | 112006001499 A5 | 3/2008 |
| DE | 112006001567 A5 | 3/2008 |
| DE | 112006001803 A5 | 4/2008 |
| DE | 112006001804 A5 | 4/2008 |
| DE | 102006049163 A1 | 5/2008 |
| DE | 202007001444 U1 | 6/2008 |
| DE | 102007009026 A1 | 8/2008 |
| DE | 102007058704 A1 | 8/2008 |
| DE | 102007011060 A1 | 9/2008 |
| DE | 102007011923 A1 | 9/2008 |
| DE | 112006002810 A5 | 10/2008 |
| DE | 112007000351 A5 | 11/2008 |
| DE | 112007001650 A5 | 4/2009 |
| DE | 112008000287 A5 | 10/2009 |
| DE | 102008037713 A1 | 2/2010 |
| DE | 102009027452 A1 | 1/2011 |
| DE | 102010006036 A1 | 7/2011 |
| DE | 102010005848 B4 | 3/2012 |
| DE | 102010005850 B4 | 3/2012 |
| DE | 102010005849 B4 | 4/2012 |
| DE | 102010033466 B4 | 11/2012 |
| DE | 202012009837 U1 | 1/2014 |
| DE | 202012009944 U1 | 1/2014 |
| DE | 102012014261 A1 | 2/2014 |
| DE | 102013001263 A1 | 7/2014 |
| DE | 102013211526 A1 | 12/2014 |
| DE | 102013219755 A1 | 4/2015 |
| DE | 102013221031 A1 | 4/2015 |
| DE | 112007000131 B4 | 7/2015 |
| DE | 102014006652 A1 | 11/2015 |
| DE | 102014214693 A1 | 1/2016 |
| DE | 102006039962 B4 | 2/2016 |
| DE | 102014015960 A1 | 5/2016 |
| DE | 102014015961 A1 | 5/2016 |
| DE | 102014016135 A1 | 5/2016 |
| DE | 202015001463 U1 | 5/2016 |
| DE | 102015203552 A1 | 9/2016 |
| DE | 102015207175 A1 | 10/2016 |
| DE | 202014010859 U1 | 12/2016 |
| DE | 102015215983 A1 | 2/2017 |
| DE | 102015226767 A1 | 6/2017 |
| DE | 102015226768 A1 | 6/2017 |
| DE | 102016200150 A1 | 7/2017 |
| DE | 112006001802 B9 | 8/2017 |
| DE | 102016209235 A1 | 11/2017 |
| DE | 102016209236 A1 | 11/2017 |
| DE | 102010028905 B4 | 12/2017 |
| DE | 102016209710 A1 | 12/2017 |
| DE | 102016209716 A1 | 12/2017 |
| DE | 102016209722 A1 | 12/2017 |
| DE | 102012019851 B4 | 3/2018 |
| DE | 102016216460 A1 | 3/2018 |
| DE | 102016012585 A1 | 4/2018 |
| DE | 102017207255 A1 | 10/2018 |
| DE | 102007016159 B4 | 11/2018 |
| DE | 102017004232 A1 | 11/2018 |
| DE | 102017212144 A1 | 1/2019 |
| DE | 102010005847 B4 | 9/2019 |
| DE | 102019200705 B3 | 1/2020 |
| DE | 102005060429 B4 | 6/2020 |
| DE | 102019201950 A1 | 8/2020 |
| DE | 102019202614 A1 | 8/2020 |
| DE | 102016219119 B4 | 9/2020 |
| DE | 102019207282 A1 | 11/2020 |
| DE | 102019117260 A1 | 12/2020 |
| DE | 102019211474 A1 | 2/2021 |
| DE | 102019211568 A1 | 2/2021 |
| DE | 102019211920 A1 | 2/2021 |
| DE | 112006003249 B4 | 11/2021 |
| DK | 1510809 T3 | 4/2013 |
| DK | 2154514 | 5/2014 |
| DK | 2720036 T3 | 3/2017 |
| DK | 3062113 T3 | 10/2019 |
| DK | 3463695 T3 | 7/2020 |
| DK | 1789775 T3 | 8/2021 |
| EA | 12468 B1 | 10/2009 |
| EA | 201290447 A1 | 2/2013 |

(56) References Cited

FOREIGN PATENT DOCUMENTS

| | | |
|---|---|---|
| EA | 201290448 A1 | 2/2013 |
| EA | 201290449 A1 | 2/2013 |
| EA | 201290450 A1 | 2/2013 |
| EA | 25444 B1 | 12/2016 |
| EP | 1484160 A1 | 12/2004 |
| EP | 1537976 A1 | 6/2005 |
| EP | 1472189 B1 | 10/2005 |
| EP | 1588961 A2 | 10/2005 |
| EP | 1630550 A1 | 3/2006 |
| EP | 1596186 A3 | 4/2006 |
| EP | 1647391 A1 | 4/2006 |
| EP | 1473139 B1 | 5/2006 |
| EP | 1520681 B1 | 5/2006 |
| EP | 1352831 B1 | 7/2006 |
| EP | 1590246 B1 | 11/2006 |
| EP | 1535719 B1 | 3/2007 |
| EP | 1535720 B1 | 4/2007 |
| EP | 1574318 B1 | 4/2007 |
| EP | 1531978 B1 | 9/2007 |
| EP | 1566550 B1 | 9/2007 |
| EP | 1588961 A3 | 9/2007 |
| EP | 1566258 B1 | 10/2007 |
| EP | 1868785 A1 | 12/2007 |
| EP | 1868791 A1 | 12/2007 |
| EP | 1968778 A2 | 9/2008 |
| EP | 1789247 B1 | 10/2008 |
| EP | 1977990 A1 | 10/2008 |
| EP | 1539599 B1 | 7/2009 |
| EP | 1798017 B1 | 7/2009 |
| EP | 1660303 B1 | 9/2009 |
| EP | 1789248 B1 | 1/2010 |
| EP | 1706359 B1 | 12/2010 |
| EP | 1979153 B1 | 2/2011 |
| EP | 2040905 B1 | 5/2011 |
| EP | 2044334 B1 | 5/2011 |
| EP | 2114804 B1 | 5/2011 |
| EP | 1919690 B1 | 9/2011 |
| EP | 2054214 B1 | 9/2011 |
| EP | 2081752 B1 | 10/2011 |
| EP | 2528729 A1 | 12/2012 |
| EP | 2528730 A1 | 12/2012 |
| EP | 2528731 A1 | 12/2012 |
| EP | 2448820 B1 | 1/2013 |
| EP | 1510809 B1 | 4/2013 |
| EP | 2593369 A1 | 5/2013 |
| EP | 2139665 B1 | 10/2013 |
| EP | 1868767 B1 | 4/2014 |
| EP | 2154514 B1 | 4/2014 |
| EP | 2719644 A1 | 4/2014 |
| EP | 1732743 B1 | 8/2014 |
| EP | 1998950 B1 | 10/2014 |
| EP | 1660302 B1 | 2/2015 |
| EP | 1773571 B1 | 2/2015 |
| EP | 1907190 B1 | 9/2015 |
| EP | 1871590 B1 | 11/2015 |
| EP | 2948300 A1 | 12/2015 |
| EP | 2117806 B1 | 1/2016 |
| EP | 1858689 B1 | 3/2016 |
| EP | 3023774 A1 | 5/2016 |
| EP | 1910056 B1 | 8/2016 |
| EP | 2440384 B1 | 8/2016 |
| EP | 1520681 B2 | 12/2016 |
| EP | 2720036 B1 | 12/2016 |
| EP | 1827798 B1 | 1/2017 |
| EP | 3153848 A1 | 4/2017 |
| EP | 2601046 B1 | 9/2017 |
| EP | 3212394 A1 | 9/2017 |
| EP | 3212524 A1 | 9/2017 |
| EP | 3255415 A4 | 1/2018 |
| EP | 3262324 A1 | 1/2018 |
| EP | 3311346 A1 | 4/2018 |
| EP | 3312592 A1 | 4/2018 |
| EP | 3124409 B1 | 6/2018 |
| EP | 3397477 A1 | 11/2018 |
| EP | 3397480 A1 | 11/2018 |
| EP | 3398886 A1 | 11/2018 |
| EP | 2129508 B1 | 1/2019 |
| EP | 3464071 A1 | 4/2019 |
| EP | 3464072 A1 | 4/2019 |
| EP | 3465173 A1 | 4/2019 |
| EP | 3062113 B1 | 8/2019 |
| EP | 3041803 B1 | 11/2019 |
| EP | 2528728 B1 | 12/2019 |
| EP | 2528732 B1 | 12/2019 |
| EP | 3052415 B1 | 3/2020 |
| EP | 3172820 B1 | 5/2020 |
| EP | 3463695 B8 | 5/2020 |
| EP | 3651984 A1 | 5/2020 |
| EP | 3465172 B1 | 7/2020 |
| EP | 3718766 A1 | 10/2020 |
| EP | 3011281 B1 | 11/2020 |
| EP | 3057892 B1 | 12/2020 |
| EP | 3757553 A1 | 12/2020 |
| EP | 3519186 B1 | 3/2021 |
| EP | 2874815 B1 | 4/2021 |
| EP | 1660301 B2 | 6/2021 |
| EP | 1789775 B1 | 6/2021 |
| EP | 3507082 B1 | 8/2021 |
| EP | 3908812 A1 | 11/2021 |
| EP | 3931106 A1 | 1/2022 |
| EP | 3255415 B1 | 6/2022 |
| EP | 4016057 A1 | 6/2022 |
| ES | 2248519 T3 | 3/2006 |
| ES | 2264785 T3 | 1/2007 |
| ES | 2268311 T3 | 3/2007 |
| ES | 2276330 T3 | 6/2007 |
| ES | 2357059 T3 | 4/2011 |
| ES | 2599354 T3 | 2/2017 |
| ES | 2653683 T3 | 2/2018 |
| ES | 2686564 T3 | 10/2018 |
| ES | 2773938 T3 | 7/2020 |
| ES | 2776128 T3 | 7/2020 |
| ES | 2799023 T3 | 12/2020 |
| ES | 2873378 T3 | 11/2021 |
| ES | 2876017 T3 | 11/2021 |
| HK | 1248370 A1 | 10/2018 |
| HU | E031103 T2 | 6/2017 |
| HU | E047974 T2 | 5/2020 |
| IL | 244616 B | 10/2019 |
| IN | 273362 B | 8/2007 |
| IN | 409/DELNP/2015 | 6/2015 |
| IN | 352637 B | 6/2016 |
| IN | 201617030759 A | 12/2016 |
| IN | 201717022889 A | 3/2018 |
| IT | 2004MO0295 A1 | 2/2005 |
| IT | 2009VI0107 A1 | 11/2010 |
| IT | 1398805 B1 | 3/2013 |
| IT | 2016UA2629 A1 | 10/2017 |
| IT | 201600082928 A1 | 2/2018 |
| IT | 201600132656 A1 | 6/2018 |
| JP | 2005326423 A | 11/2005 |
| JP | 2007504020 A | 3/2007 |
| JP | 2007504021 A | 3/2007 |
| JP | 2007504022 A | 3/2007 |
| JP | 2008513238 A | 5/2008 |
| JP | 2008513239 A | 5/2008 |
| JP | 2008532809 A | 8/2008 |
| JP | 2009503380 A | 1/2009 |
| JP | 2009523636 A | 6/2009 |
| JP | 4918546 B2 | 4/2012 |
| JP | 5002594 B2 | 8/2012 |
| JP | 5081839 B2 | 11/2012 |
| JP | 5202300 B2 | 6/2013 |
| JP | 5244823 B2 | 7/2013 |
| JP | 5244825 B2 | 7/2013 |
| JP | 5276845 B2 | 8/2013 |
| JP | 2013534195 A | 9/2013 |
| JP | 5401305 B2 | 1/2014 |
| JP | 6223679 B2 | 11/2017 |
| JP | 2017534538 A | 11/2017 |
| JP | 6257749 B2 | 1/2018 |
| JP | 6307598 B2 | 4/2018 |
| JP | 2018524714 A | 8/2018 |
| JP | 6463382 B2 | 1/2019 |

(56) References Cited

FOREIGN PATENT DOCUMENTS

| | | | |
|---|---|---|---|
| JP | 2019501800 A | 1/2019 |
| JP | 2019501801 A | 1/2019 |
| JP | 6522143 B2 | 5/2019 |
| JP | 2019517397 A | 6/2019 |
| JP | 2019517398 A | 6/2019 |
| JP | 2019528204 A | 10/2019 |
| JP | 2019530623 A | 10/2019 |
| JP | 6667016 B2 | 3/2020 |
| JP | 6685897 B2 | 4/2020 |
| JP | 6690023 B2 | 4/2020 |
| JP | 6722664 B2 | 7/2020 |
| JP | 2020526426 A | 8/2020 |
| JP | 6784778 B2 | 11/2020 |
| KR | 20130008012 A | 1/2013 |
| KR | 20130082442 A | 7/2013 |
| KR | 101809286 B1 | 12/2017 |
| KR | 20180039627 A | 4/2018 |
| MX | 2011013438 A | 5/2012 |
| MX | 2013000382 A | 9/2013 |
| MX | 337239 B | 2/2016 |
| MX | 337240 B | 2/2016 |
| MX | 2015009508 A | 3/2016 |
| MX | 2017005599 A | 6/2017 |
| MX | 2017005600 A | 6/2017 |
| MX | 350528 B | 9/2017 |
| MX | 2017016866 A | 4/2018 |
| MX | 2018013219 A | 2/2019 |
| MX | 2019002246 A | 6/2019 |
| MX | 2018014657 A | 8/2019 |
| MX | 2019003734 A | 8/2019 |
| MX | 371292 B | 1/2020 |
| PL | 1520681 T3 | 11/2006 |
| PL | 1590246 T3 | 3/2007 |
| PL | 2601046 T3 | 3/2018 |
| PL | 2528728 T3 | 6/2020 |
| PL | 2528732 T3 | 6/2020 |
| PL | 3519186 T3 | 10/2021 |
| PL | 2874815 T3 | 11/2021 |
| PT | 1706359 E | 2/2011 |
| PT | 2440384 T | 10/2016 |
| RU | 2005135656 A | 8/2006 |
| RU | 2535062 C2 | 12/2014 |
| RU | 2015127669 A | 3/2017 |
| RU | 2636730 C2 | 11/2017 |
| RU | 2647232 C2 | 3/2018 |
| RU | 2648577 C2 | 3/2018 |
| RU | 2661463 C2 | 7/2018 |
| RU | 2017112076 A | 11/2018 |
| RU | 2017112079 A | 12/2018 |
| RU | 2723284 C2 | 6/2020 |
| TW | 200512133 A | 4/2005 |
| WO | 2003066534 B1 | 11/2003 |
| WO | 2004020173 A1 | 3/2004 |
| WO | 2004024577 A3 | 7/2004 |
| WO | 2005016758 A1 | 2/2005 |
| WO | 2005023517 A1 | 3/2005 |
| WO | 2005023518 A1 | 3/2005 |
| WO | 2005023519 A1 | 3/2005 |
| WO | 2005023520 A1 | 3/2005 |
| WO | 2005070837 A1 | 8/2005 |
| WO | 2005097466 A1 | 10/2005 |
| WO | 2006021219 A1 | 3/2006 |
| WO | 2006005324 A3 | 4/2006 |
| WO | 2006056840 A2 | 6/2006 |
| WO | 2006058511 A1 | 6/2006 |
| WO | 2006056840 A3 | 8/2006 |
| WO | 2006097056 A1 | 9/2006 |
| WO | 2006058512 A3 | 10/2006 |
| WO | 2006105769 A1 | 10/2006 |
| WO | 2006108380 A2 | 10/2006 |
| WO | 2006108382 A1 | 10/2006 |
| WO | 2006111127 A3 | 12/2006 |
| WO | 2007012308 A1 | 2/2007 |
| WO | 2007033631 A2 | 3/2007 |
| WO | 2006108380 A3 | 4/2007 |
| WO | 2006029584 A8 | 5/2007 |
| WO | 2006029585 A8 | 5/2007 |
| WO | 2007012307 A3 | 5/2007 |
| WO | 2007065392 A2 | 6/2007 |
| WO | 2007085226 A1 | 8/2007 |
| WO | 2007104273 A1 | 9/2007 |
| WO | 2008022612 A2 | 2/2008 |
| WO | 2008006347 A3 | 3/2008 |
| WO | 2008046369 A1 | 4/2008 |
| WO | 2007033631 A3 | 6/2008 |
| WO | 2007012309 A3 | 7/2008 |
| WO | 2007065392 A3 | 7/2008 |
| WO | 2008022612 A3 | 8/2008 |
| WO | 2008101468 A2 | 8/2008 |
| WO | 2008106921 A1 | 9/2008 |
| WO | 2008106922 A1 | 9/2008 |
| WO | 2008116435 A2 | 10/2008 |
| WO | 2008101468 A3 | 11/2008 |
| WO | 2008098565 A3 | 12/2008 |
| WO | 2007110018 A9 | 2/2009 |
| WO | 2008116435 A3 | 4/2010 |
| WO | 2010128384 A1 | 11/2010 |
| WO | 2011000606 A1 | 1/2011 |
| WO | 2011091987 A1 | 8/2011 |
| WO | 2011091988 A1 | 8/2011 |
| WO | 2011091989 A1 | 8/2011 |
| WO | 2011092002 A1 | 8/2011 |
| WO | 2011092037 A1 | 8/2011 |
| WO | 2010143219 A3 | 10/2011 |
| WO | 2012007056 A1 | 1/2012 |
| WO | 2012016701 A1 | 2/2012 |
| WO | 2014023393 A1 | 2/2014 |
| WO | 2014-093341 A1 | 6/2014 |
| WO | 2014114460 A1 | 7/2014 |
| WO | 2014202340 A1 | 12/2014 |
| WO | 2015043987 A1 | 4/2015 |
| WO | 2015055529 A1 | 4/2015 |
| WO | 2015136037 A1 | 9/2015 |
| WO | 2015146628 A1 | 10/2015 |
| WO | 2016012158 A1 | 1/2016 |
| WO | 2016066592 A1 | 5/2016 |
| WO | 2016066593 A1 | 5/2016 |
| WO | 2016125633 A1 | 8/2016 |
| WO | 2016134809 A1 | 9/2016 |
| WO | 2017114704 A1 | 7/2017 |
| WO | 2017114705 A1 | 7/2017 |
| WO | 2017202914 A1 | 11/2017 |
| WO | 2017202919 A1 | 11/2017 |
| WO | 2017207175 A1 | 12/2017 |
| WO | 2017207176 A1 | 12/2017 |
| WO | 2017207177 A1 | 12/2017 |
| WO | 2016202471 A8 | 2/2018 |
| WO | 2018041706 A1 | 3/2018 |
| WO | 2018060330 A1 | 4/2018 |
| WO | 2019012075 A1 | 1/2019 |
| WO | 2020151950 A1 | 7/2020 |
| WO | 2020165380 A1 | 8/2020 |
| WO | 2020201564 A1 | 10/2020 |
| WO | 2020233881 A1 | 11/2020 |
| WO | 2021018428 A1 | 2/2021 |
| WO | 2021018997 A1 | 2/2021 |
| WO | 2021054376 A1 | 3/2021 |

OTHER PUBLICATIONS

International Search Report and Written Opinion dated May 11, 2023 for Application No. PCT/US2023/011355.

\* cited by examiner

PULSED ILLUMINATION FOR FLUID INSPECTION

BACKGROUND

Field

Embodiments of the present disclosure generally relate to a method and system for product inspection, and more particularly to a method and system for the inspection of fluids for defects.

Description of the Related Art

Pharmaceutical fluids such as medications, supplements, or other drugs may be stored in containers, such as vials, ampules, cartridges, and pre-filled syringes. To ensure the proper, and safe preparation of these fluids, the pharmaceutical industry is focused on the inspection of the fluids while in the containers to ensure quality and safety of the product. For some medicinal and/or supplement products, inspections may be done for quality assurance or as a requirement of government or industry regulations.

To inspect the defects, cameras capture images of the fluids. The images are processed and used for defect detection and identification. Generally, it is desirable to inspect the fluids with high-frame rate cameras having a high resolution such that the defects are visible and may be tracked between subsequent images. However, due to the data rate limits of cameras, it is difficult to obtain high resolution images at a high frame rate. As such, obtaining images having high resolution and images that capture the defects without smearing of the image is difficult, thus limiting the reliability of this technique for quality control.

Therefore, what is needed is a system and method for the inspection of pharmaceutical fluids and the like, that allows for high resolution images and imaging of the defects without smearing effects.

SUMMARY

In one embodiment, a fluid inspection system is provided. The fluid inspection system includes a transportation system configured to transport a plurality of containers of fluid through an inspection zone. The fluid inspection system further includes at least one illuminator directed to the inspection zone, one or more cameras directed to the inspection zone, and one or more actuators disposed proximate to the inspection zone and operable to rotate the plurality of containers of fluid such that the fluid within the containers remains rotating for at least a portion of time the containers are in inspection zone. The fluid inspection system further includes a controller in communication with the at least one illuminator and the one or more cameras. The controller is configured to cause the at least one illuminators to emit pulses of light according to a timing sequence and capture a plurality of images of fluid rotating in the plurality of containers disposed in the inspection zone. An illumination time of the pulses of light is less than an exposure time of each frame of the one or more cameras.

In another embodiment, a method of inspecting fluid is provided. The method includes moving a plurality of containers containing fluid into an inspection zone of an inspection system, rotating the plurality of containers containing the fluid, and stopping the rotation of the plurality of containers. The method further includes capturing a plurality of images of the plurality of containers that have stopped rotating with one or more cameras by rotating fluid disposed therein while in the inspection zone. An illumination time of pulses of light in the inspection zone is less than an exposure time of each frame of a plurality of frames of the one or more cameras.

In yet another embodiment, a non-transitory computer-readable medium is provided. The non-transitory computer-readable medium is storing instructions that, when executed by a processor coupled to an inspection system, cause the inspection system to move a plurality of containers containing fluid into an inspection zone of an inspection system, rotate the plurality of containers containing the fluid, and stop the rotation of the plurality of containers. The inspection system will further capture a plurality of images of the plurality of containers that have stopped rotating with one or more cameras by rotating fluid disposed therein while in the inspection zone. An illumination time of pulses of light in the inspection zone is less than an exposure time of each frame of a plurality of frames of the one or more cameras.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to a method and system for product inspection, and more particularly to a method and system for the inspection of fluids for defects. The method and system described herein is particularly advantageous for the inspection of pharmaceutical fluids, but has equal application to the inspection of other types of fluids. In this context, 'pharmaceutical' is not meant to be limiting as to the type of fluid described below, but provided as an example of a fluid that requires defect inspection may be inspected with the disclosed systems and by the disclosed methods.

Figure 1:
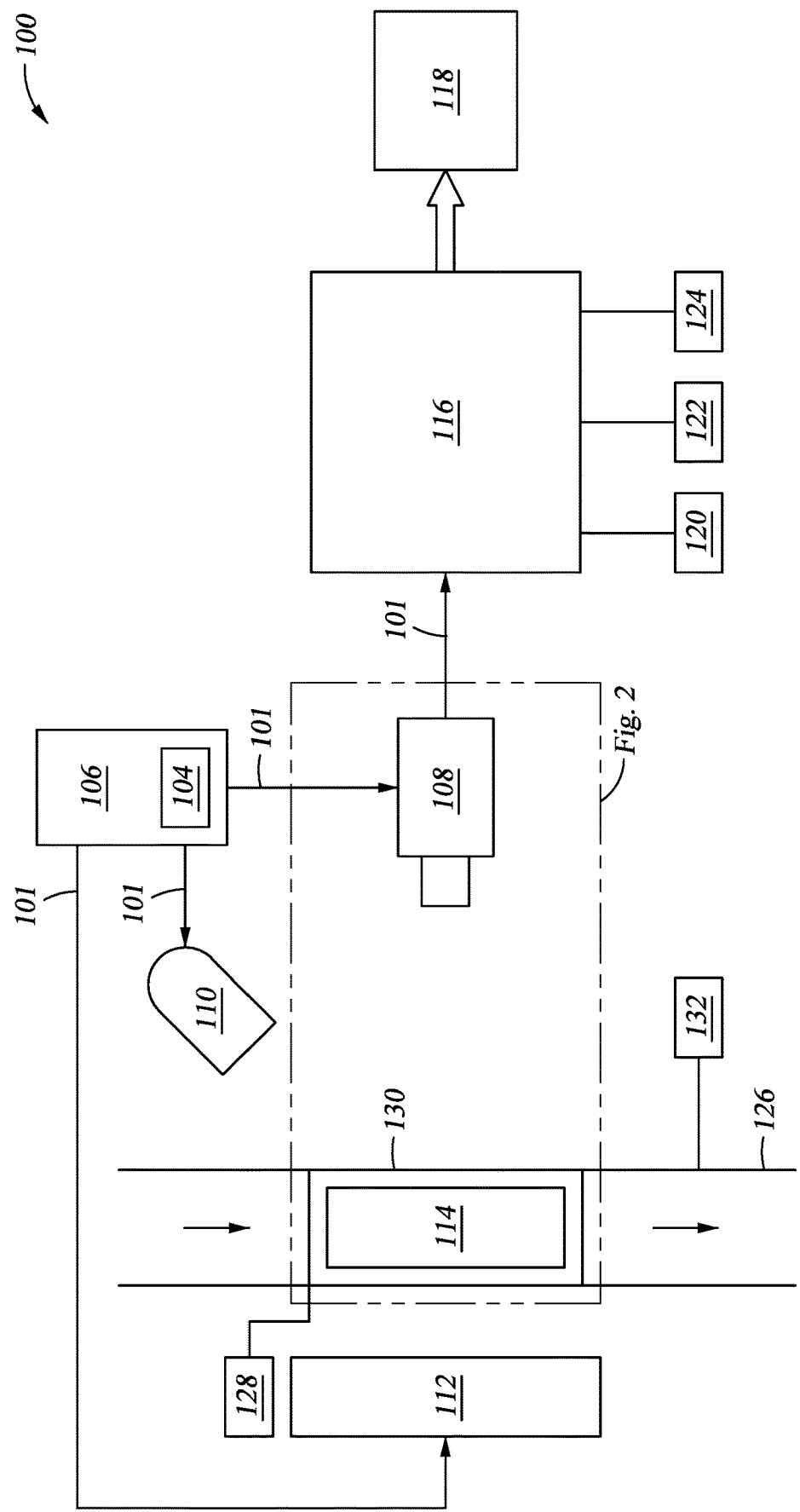
FIG. 1 is a schematic view of an inspection system, according to embodiments described herein.

FIG. 1 is a schematic view of an inspection system 100. The inspection system 100 is configured to capture a plurality of images of fluids (such as pharmaceutical fluid or other fluid) that are contained in transparent containers 114, such as vials, ampules, cartridges and pre-filled syringes, among other containers. The images are utilized to identify defects in the fluids. The inspection system 100 is not limited in the type of pharmaceutical or other fluid that may be inspected. The inspection system 100 is operable to inspect fluids disposed in at least one container 114.

The inspection system 100 includes at least a trigger timing generator 104, a controllers 106, a reflection illuminator 110, a transmission illuminator 112, one or more cameras 108, a computer system 116, a transportation system 126, a sensor 128, and a motor 132. The trigger timing generator 104, the controller 106, the camera 108, the reflection illuminator 110, the transmission illuminator 112, the computer system 116, the transportation system 126, and the sensor 128 may communicate via communication links 101 or remotely.

The containers 114 are provided to an inspection zone 130 of the inspection system 100 by the transportation system 126. The transportation system 126 includes, but is not limited to, a conveyor, a carousel, a robot, a pallet, or other container transportation systems operable to move the containers 114 into the inspection zone 130. The transportation system 126 is also configured to move the containers 114 out of the inspection zone 130 after inspection. During inspection, the containers 114 may be stationary in the inspection zone 130 or may be moving through the inspection zone 130. For example, the transportation system 126 may move the containers 114 to the inspection zone 130, pause the motion of the containers 114 during inspection while in the inspection zone 130, then move inspected containers 114 out of the inspection zone 130 so that the next one or more containers 114 may be moved to the inspection zone 130 for inspection. In another example, the transportation system 126 may continuously move the containers 114 through the inspection zone 130 while the containers 114 are being inspected containers 114, for example while on a conveyor.

The sensor 128 is interfaced with the transportation system 126 in a position that enables the sensor 128 to detect the position of the containers 114 while being carried by the transportation system 126. In one example, the sensor 128 will detect when the containers 114 are in the inspection zone 130. In another example, the sensor 128 will detect when the containers 114 are at a position along the transportation system 126 so that the timing of when the containers 114 will be in the inspection zone 130 can be determined. The sensor 128 generates a trigger signal when the presence of the container 114 is detected on the transportation system 126. For example, the trigger signal may be generated when the sensor 128 detects the containers 114 are in the inspection zone 130 or when the containers 114 are at a pre-determined position from which it can be determined when the containers 114 will arrive in the inspection zone 130 for inspection. The sensor 128 is coupled to and provides the trigger signal to the controller 106.

The controller 106 is configured to facilitate the control the inspection process described herein. The controller 106 is in communication with the reflection illuminator 110, the transmission illuminator 112, and the one or more cameras 108 via the communication links 101. The controller 106 is in communication with the sensor 128. Using the trigger signal provided by the sensor 128, the controller 106 determines the positional information of the containers 114 relative to the inspection zone 130. In embodiments where the controller 106 receives a trigger signal indicative of the transportation system 126 moving the containers 114 towards the inspection zone 130, the controller 106 utilizes speed information (either from a look-up table, system library, sensed or otherwise provided) to determine when the containers 114 will arrive in the inspection zone 130 and be ready for inspection.

In one example, the trigger timing generator 104 is a software that is executable by the controller 106. The trigger timing generator 104 may alternatively be hardware, a combination of hardware and software, or even a separate controller. The trigger timing generator 104 is operable to generate a timing sequence (see FIG. 3 and FIG. 4) to be utilized by the controller 106 to obtain inspection data from the fluid disposed in the containers 114 present in the inspection zone 130. The controller 106 instructs the reflection illuminator 110 and/or the transmission illuminator 112 (i.e., "illuminators") to provide the pulses of light that illuminate the inspection zone 130 according to the timing sequence. The controller 106, based on the timing sequence, controls the sequence of pulses of light that are provided to the inspection zone 130. The timing sequence includes instructions regarding intervals between the pulses of light. The controller 106, also based on the timing sequence, controls the timing and operation of the one or more cameras 108 so as to capture the plurality of images of the fluid disposed in the containers 114 in the inspection zone 130. The plurality of images are provided to the computer system 116 and become the inspection data utilized to inspect the fluid disposed in the containers 114. The timing sequence, based on the trigger signal (and in some instances also the container speed information), allows the controller 106 to begin the inspection process when the containers 114 are in the inspection zone 130.

As discussed above, the trigger signal and optionally the speed information provided to the controller 106 allows for the controller 106 to initiate the instructions to the reflection illuminator 110, the transmission illuminator 112, and the one or more cameras 108 when the containers 114 are in the inspection zone 130. The controller 106, based on the timing sequence provided by the trigger timing generator 104, ensures that the pulses of light are provided simultaneously with the capturing fluid images by one or more cameras 108 when the containers 114 are in the inspection zone 130.

The reflection illuminator 110 and the transmission illuminator 112 are configured to provide the pulses of light to illuminate the containers 114 while the containers 114 are in the inspection zone 130. The reflection illuminator 110 is configured to project light to the containers 114 such that the light is reflected off of the containers 114 and the fluid disposed therein. The light is reflected from the containers 114 and the fluids towards the camera 108. The transmission illuminator 112 is configured to project light through the containers 114 and the fluids disposed therein. The light is transmitted through the containers 114 and the fluids to the camera 108. The inspection system 100 is not limited to one reflection illuminator 110 and one transmission illuminator 112. The inspection system 100 may include one or more of each of the reflection illuminator 110 and the transmission illuminator 112. The reflection illuminator 110 and the transmission illuminator 112 provide the pulses of light according to the timing sequence provided by the controller 106.

The reflection illuminator 110 and the transmission illuminator 112 alternate between an "off" position, where no light is projected, and an "on" position, where light is projected to the inspection zone 130 to be incident on at least one container 114 positioned in the inspection zone 130. The sequence of toggling from the "off" position, to the "on" position, and back to the "off" position, is defined as a pulse. The reflection illuminator 110 and/or the transmission illuminator 112 are toggled from the "off" position to the "on" position according to the timing sequence executed by the controller 106. The "off" position may be achieved by turning off the reflection illuminator 110 and/or the transmission illuminator 112 or by closing a shutter on the reflection illuminator 110 and/or the transmission illuminator 112 to block the light. The "on" position may be achieved by turning on the reflection illuminator 110 and/or the transmission illuminator 112 or by opening a shutter on the reflection illuminator 110 and/or the transmission illuminator 112 to provide light to the inspection zone 130. In some embodiments, which can be combined with other embodiments described herein, only the reflection illuminator 110 projects light to the fluid contained in the at least one container 114 present in the inspection zone 130. In other embodiments, only the transmission illuminator 112 projects light to the fluid contained in the at least one container 114 present in the inspection zone 130. In yet another embodiment, which can be combined with other embodiments described herein, both the transmission illuminator 112 and the reflection illuminator 110 simultaneously project light to the fluid contained in at least one container 114 present in the inspection zone 130.

The inspection system 100 further includes the one or more cameras 108. The cameras 108 are positioned to capture images of the fluids in the containers 114 in the inspection zone 130. For example, cameras 108 may be disposed around the containers 114 at intervals of 120° such that each of the cameras 108 captures images of one third of the containers 114. Each camera 108 is positioned to capture images of at least a portion of the fluid, with all of the cameras 108 capable of imaging an entire surface of the containers 114. Each camera 108 is a high-resolution camera. The resolution of each camera 108 is greater than at least 20 MP. For example, the resolution of each camera is about 25 MP. The cameras 108 have a frame rate between about 10 FPS and about 15 FPS. For example, the frame rate of each camera 108 is 15 FPS.

The computer system 116 includes a processor 120 and a data storage (i.e., memory) 124. The processor 120 communicates with the data storage 124. The computer system 116 may also communicate with remote servers 122 via a local connection (for example, a Storage Area Network (SAN) or Network Attached Storage (NAS)) or over the Internet. The computer system 116 may be configured to all one or more of the servers 122 to either directly access data (i.e., the images) included in the data storage 124 or to interface with a database manager that is configured to manage the data included within the data storage 124. The computer system 116 may also include components of a computing device, for example, a processor, system memory, a hard disk drive, a battery, input devices such as a mouse and a keyboard, and/or output devices such as a monitor or graphical user interface, and/or a combination input/output device such as a touchscreen which not only receives input but also displays output. The computer system 116 controls the operation of the controller 106. The processor 120 of the computer system 116 may execute software, such as programs and/or other software applications stored in the data storage 124 of the computer system 116, and access applications managed by servers 122. In the embodiments described below, users may respectively operate the computer system 116 that may be connected to the servers 122 over the communications network. The processor 120 of the computer system 116 may also execute other software applications configured to receive content and information (e.g., images) from the camera 108, and make determinations regarding the fluid contained in the images provided by the camera 108.

In operation, the trigger signal is generated by the sensor 128 when the containers 114 enter the inspection zone 130. The trigger signal is an electric signal. The trigger signal is provided to the trigger timing generator 104. The trigger timing generator 104 provides the timing sequence to the controller 106. The controller 106, based on the timing sequence, causes the reflection illuminator 110 and/or the transmission illuminator 112 to provide pulses of light to the inspection zone 130. The controller 106, also based on the timing sequence, causes the one or more cameras 108 to capture images of the containers 114 and fluid disposed therein while the containers 114 are in the inspection zone 130 and illuminated by one or both of the reflection illuminator 110 and the transmission illuminator 112. The images captured by each camera 108 are provided to the computer system 116. The images provided to the computer system 116 are processed and optionally displayed. The computer system 116 utilizes image comparison or other technique to detect defects within the fluids disposed in the containers 114. For example, the computer system 116 may compare images captured by the cameras 108 to library images stored in the data storage 124 of the computer system 116. The library images may include images of fluid without defects and images of known fluid defects. Based on the image comparison, defects in the fluid are detected, identified, and categorized. The defects may be categorized into a defects report 118 and associated with the container 114 which contain the fluid from which the images was captured.

Figure 2:
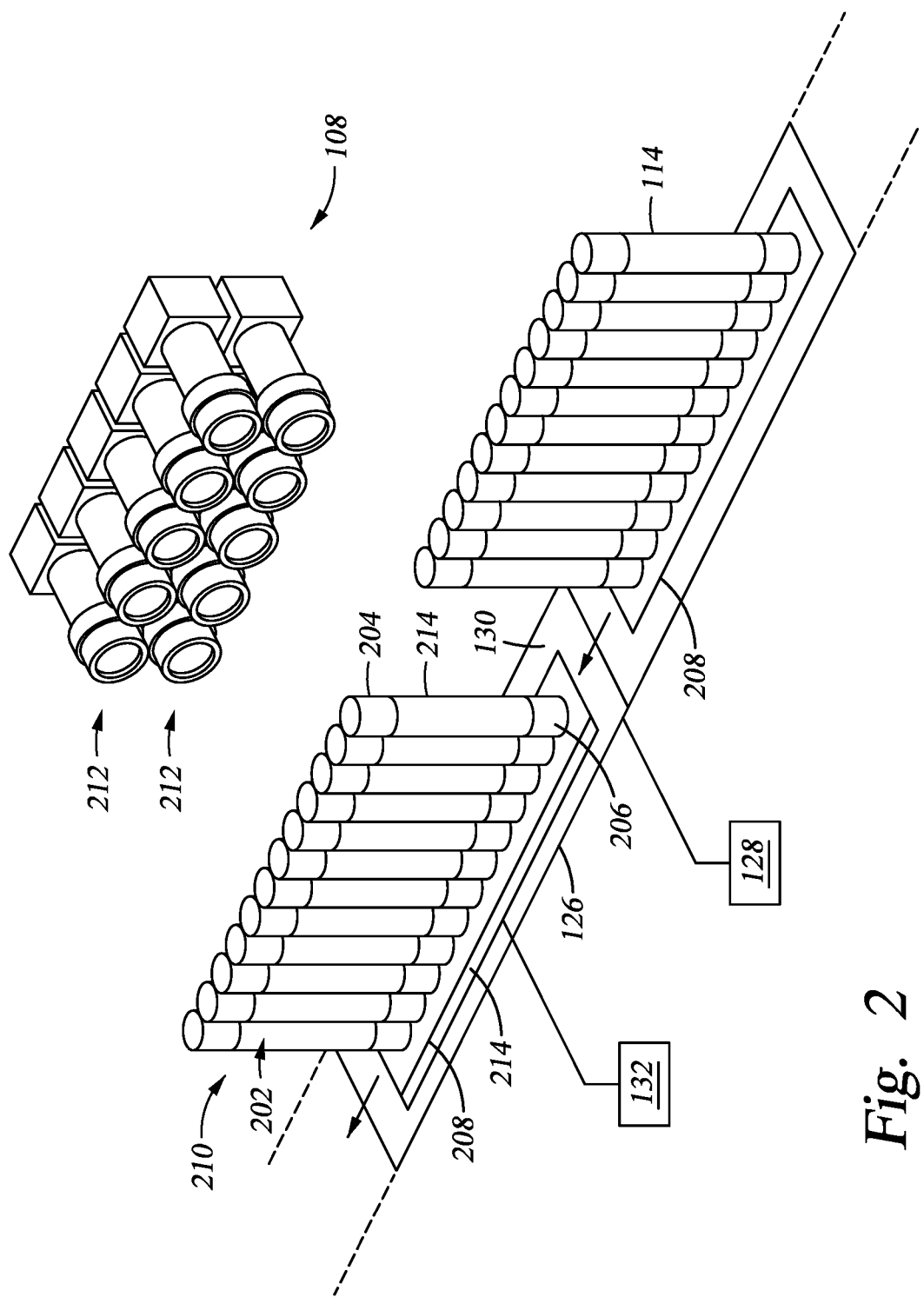
FIG. 2 is a schematic, isometric view of a plurality of cameras focused on a plurality of containers, according to embodiments described herein.

FIG. 2 is a schematic, isometric view of the plurality of cameras 108 focused on the plurality of containers 114. The containers 114 are disposed on a carrier 208. The transportation system 126 moves the carrier 208 into the inspection zone 130. In one example, the plurality of containers 114 are disposed in a row 210 on the carrier 208. In other examples, multiple carriers 208 may be stacked. As such, multiple rows 210 of the containers 114 may be stacked for simultaneous inspection by the inspection system 100. The plurality of cameras 108 are positioned in camera rows 212. As shown in FIG. 2, two cameras rows 212 are stacked. The plurality of cameras 108 are not limited in the number of camera rows 212 that may be stacked.

The plurality of containers 114 include fluids 202 disposed therein. Each container 114 includes a cap 204 to seal the fluid 202 therein. Each container 114 is positioned on an actuator 206. The actuators 206 are disposed on or coupled to the carrier 208. The actuators 206 are configured to hold the containers 114 while being transported though the inspection system 100. The actuators 206 also are rotatable relative to the carrier 208, such that the containers 114 held by the actuators 206 may be rotated while retained in the carrier 208. In one example, the actuators 206 are coupled to the carrier 208 by one or more bearings or bushings, and may be one of a cup, gripper, or any other device suitable for holding the containers 114 both when rotating and being transported through the system 100 on the carrier 208. Rotation of the actuators 206 is driven by at least one motor 132. The motor 132 may be disposed on the carrier 208 or may selectively extend through the carrier 208 to engage and rotate the actuators 206 holding the containers 114. In one example, the motor 132 may be disengaged from the actuators 206 and move clear of the carrier 208 to allow the carrier 208 to be moved through the inspection system 100. In some examples, each actuator 206 is engaged with a respective motor 132 so that all of the containers 114 may be rotated on the carrier 208 simultaneously. In another example, the motor 132 is coupled to a rotation system 214. The rotation system 214 may be a gear box system, a belt system, or any other system configured to distribute power provided from the motor 132 to each of the actuators 206. In one example, each carrier 208 may include an on-board rotation system 214. Alternatively, the rotation system 214 may selectively engage the actuators 206 of the carrier 208. The rotation system 214 links the plurality of actuators 206 together. The motor 132 is configured to engage with the rotation system 214 when the containers 114 in the carrier 208 are to be rotated. The motor 132 provides power to the rotation system 214. The rotation system 214 is configured to rotate each of the actuators 206 at the same rate. The motor 132 is also configured to disengage from the rotation system 214 to allow the carrier 208 to move freely after the containers 114 have been rotated.

Prior to and/or while capturing images of the fluid 202, the actuators 206 rotate each container 114. For example, the actuators 206 rotate the containers 114 at about 6000 RPM. The rotation of the containers 114 induces defects, such as dirt, glass, metals, or other particulates, to separate from the fluid 202. In one example, the separated defects float to the top of the fluid 202. The actuators 206 may be turned off once defects are detected by the cameras 108, after a predefined period of time and/or after the containers 114 have been rotated a predefined number of revolutions. The plurality of cameras 108 capture images of the rotated fluid 202. The actuators 206 are in communication with the controller 106. The controller 106 is operable to instruct the actuators 206 when to rotate the plurality of containers 114 and when to hold the plurality of containers 114 stationary based on the timing sequence.

Figure 3:
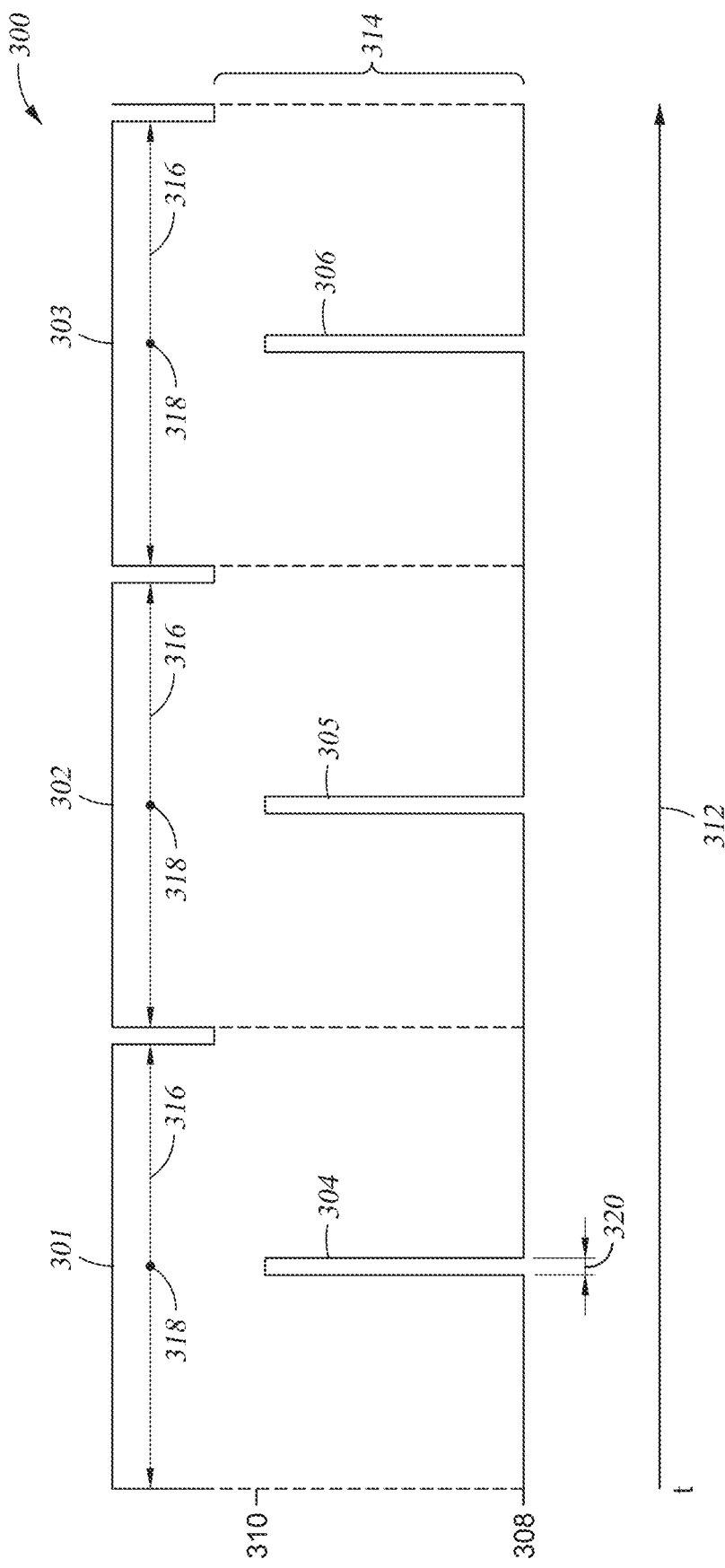
FIG. 3 is a schematic diagram of a first pulsated illumination configuration, according to embodiments described herein.

FIG. 3 is a schematic diagram of a first pulsated illumination configuration 300. The first pulsated illumination configuration 300 corresponds to a timing sequence generated by the trigger timing generator 104. The first pulsated illumination configuration 300 includes a first frame 301, a second frame 302, and a third frame 303. Although only three frames are shown in the first pulsated illumination configuration 300, more than three frames may be captured according to the first pulsated illumination configuration 300.

Each frame corresponds to an image captured by a camera 108. The first frame 301, the second frame 302, and the third frame 303 each correspond to subsequent images captured of a container 114 of fluid 202 (shown in FIG. 2). A horizontal axis 312 corresponds to time t. Therefore, the first frame 301 is captured, followed by the second frame 302, and then the third frame 303.

Each of the first frame 301, the second frame 302, and the third frame 303 include an illumination level 314. The illumination level 314 spans from a minimum illumination level 308 to a maximum illumination level 310. The illumination level 314 corresponds to an amplitude of at least one of a reflection illuminator 110 and/or a transmission illuminator 112 directed to the one or more containers 114. The minimum illumination level 308 corresponds to a 0% amplitude (no illumination). The maximum illumination level 310 corresponds to a 100% amplitude. The first frame 301 includes a first pulse 304, the second frame 302 includes a second pulse 305, and the third frame 303 includes a third pulse 306. Each of the first frame 301, the second frame 302, and the third frame 303 include an exposure time 316. The exposure time 316 is defined as the amount of time that each frame is exposed for (i.e., amount of time a shutter in the cameras 108 are open). The exposure time 316 may be the same as the time to capture each frame. For example, a 10 FPS frame rate will have each frame being captured for 0.1 s.

As shown in FIG. 3, the first pulsated illumination configuration 300 includes each of the first pulse 304, the second pulse 305, and the third pulse 306 (i.e., the pulses of light) at the maximum illumination level 310. In one embodiment, which can be combined with other embodiments described herein, the first pulse 304, the second pulse 305, and the third pulse 306 are pulsed at the maximum illumination level 310 at a center point 318 of the exposure time 316. Each of the first pulse 304, the second pulse 305, and the third pulse 306 are projected subsequently at equal intervals. As such, the illumination level 314 is maintained at the minimum illumination level 308 except for at the center point 318 of the exposure time 316. The first pulse 304, the second pulse 305, and the third pulse 306 are at the maximum illumination level 310 for an illumination time 320. The illumination time 320 is the time that each of the first pulse 304, the second pulse 305, and the third pulse 306 are provided. The illumination time 320 is less than each exposure time 316 for each frame. The illumination time 320 is about 20 µs to about 100 µs.

Figure 4:
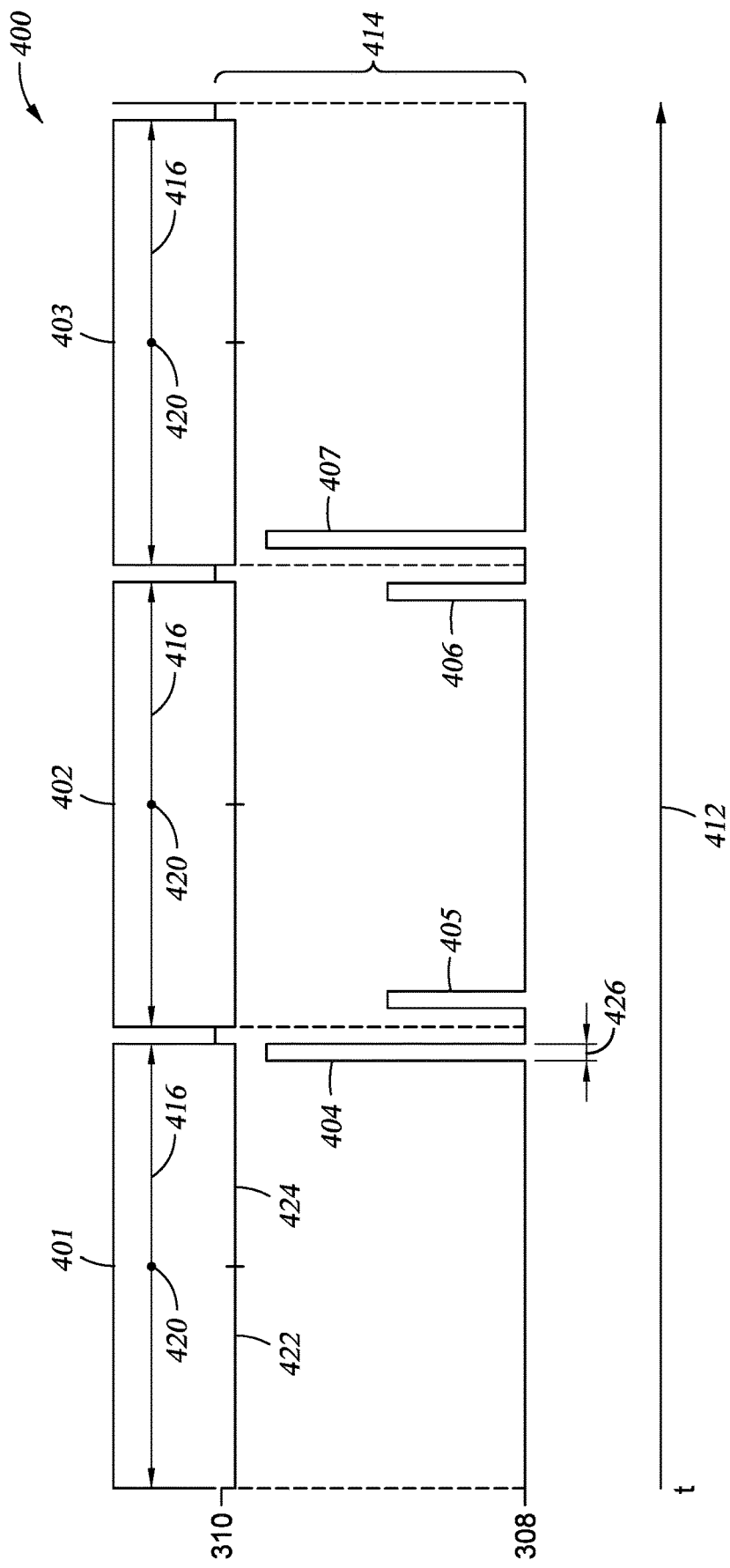
FIG. 4 is a schematic diagram of a second pulsated illumination configuration, according to embodiments described herein.

FIG. 4 is a schematic diagram of a second pulsated illumination configuration 400. The second pulsated illumination configuration 400 corresponds to a timing sequence generated by the trigger timing generator 104. The second pulsated illumination configuration 400 includes a first frame 401, a second frame 402, and a third frame 403. Although only three frames are shown in the second pulsated illumination configuration 400, more than three frames may be captured according to the second pulsated illumination configuration 400.

Each frame corresponds to an image captured by a camera 108. The first frame 401, the second frame 402, and the third frame 403 each correspond to subsequent images captured of a container 114 of fluid 202 (shown in FIG. 2). A horizontal axis 412 corresponds to time t. Therefore, the first frame 401 is captured, followed by the second frame 402, and then the third frame 403.

Each of the first frame 401, the second frame 402, and the third frame 403 include an illumination level 414. The illumination level 414 spans from a minimum illumination level 408 to a maximum illumination level 410. The illumination level 414 corresponds to an amplitude of at least one of a reflection illuminator 110 and/or a transmission illuminator 112 directed to the one or more containers 114. The minimum illumination level 408 corresponds to a 0% amplitude (no illumination). The maximum illumination level 410 corresponds to a 100% amplitude. The first frame 401 includes a first pulse 404, the second frame 402 includes a second pulse 405 and a third pulse 406, and the third frame 403 includes a fourth pulse 407. Each of the first frame 401, the second frame 402, and the third frame 403 include an exposure time 416. The exposure time 416 is defined as the amount of time that each frame is exposed for (i.e., amount of time a shutter in the cameras 108 are open). The exposure time 416 may be the same as the time to capture each frame. For example, a 10 FPS frame rate will have each frame being captured for 0.1 s.

As shown in FIG. 4, the second pulsated illumination configuration 400 includes each of the first pulse 404 and the fourth pulse 407 at the maximum illumination level 410. The second pulse 405 and the third pulse 406 are provided at an intermediate illumination level 418. The intermediate illumination level 418 corresponds to a 50% amplitude. The first pulse 404, the second pulse 405, the third pulse 406, and the fourth pulse 407 (i.e., the pulses of light) are provided such that they are not at a center point 420 of the exposure time 416. As shown in FIG. 4, the first pulse 404 is provided in a second portion 424 of the exposure time 416 in the first frame 401. The second pulse 405 is provided in a first portion 422 of the exposure time 416 in the second frame 402. The third pulse 406 is provided in the second portion 424 of the exposure time 416 in the second frame 402. The fourth pulse 407 is provided in the first portion 422 of the exposure time 416 in the third frame 403. The first portion 422 corresponds to a first half of the exposure time 416 and the second portion 424 corresponds to a second half of the exposure time 416.

The time t (corresponding to the horizontal axis 412) between the first pulse 404 and the second pulse 405 is less than the time t between the second pulse 405 and the third pulse 406. Similarly, the time t (corresponding to the horizontal axis 412) between the third pulse 406 and the fourth pulse 407 is less than the time t between the second pulse 405 and the third pulse 406. Providing the second pulse 405 and the third pulse 406 at the intermediate illumination level 418 prevents oversaturation of an image captured during the second frame 402. As such, the illumination level 414 is maintained at the minimum illumination level 408 except for when each of the first pulse 404, the second pulse 405, the third pulse 406, and the fourth pulse 407 are provided. The first pulse 404, the second pulse 405, the third pulse 406, and the fourth pulse 407 are provided at the maximum illumination level 410 and/or the intermediate illumination level 418 for an illumination time 426. The illumination time 426 is the time that each of the first pulse 404, the second pulse 405, the third pulse 406, and the fourth pulse 407 are provided. The illumination time 426 is less than each exposure time 416 for each frame. The illumination time 426 is about 20 µs to about 100 µs.

Figure 5:
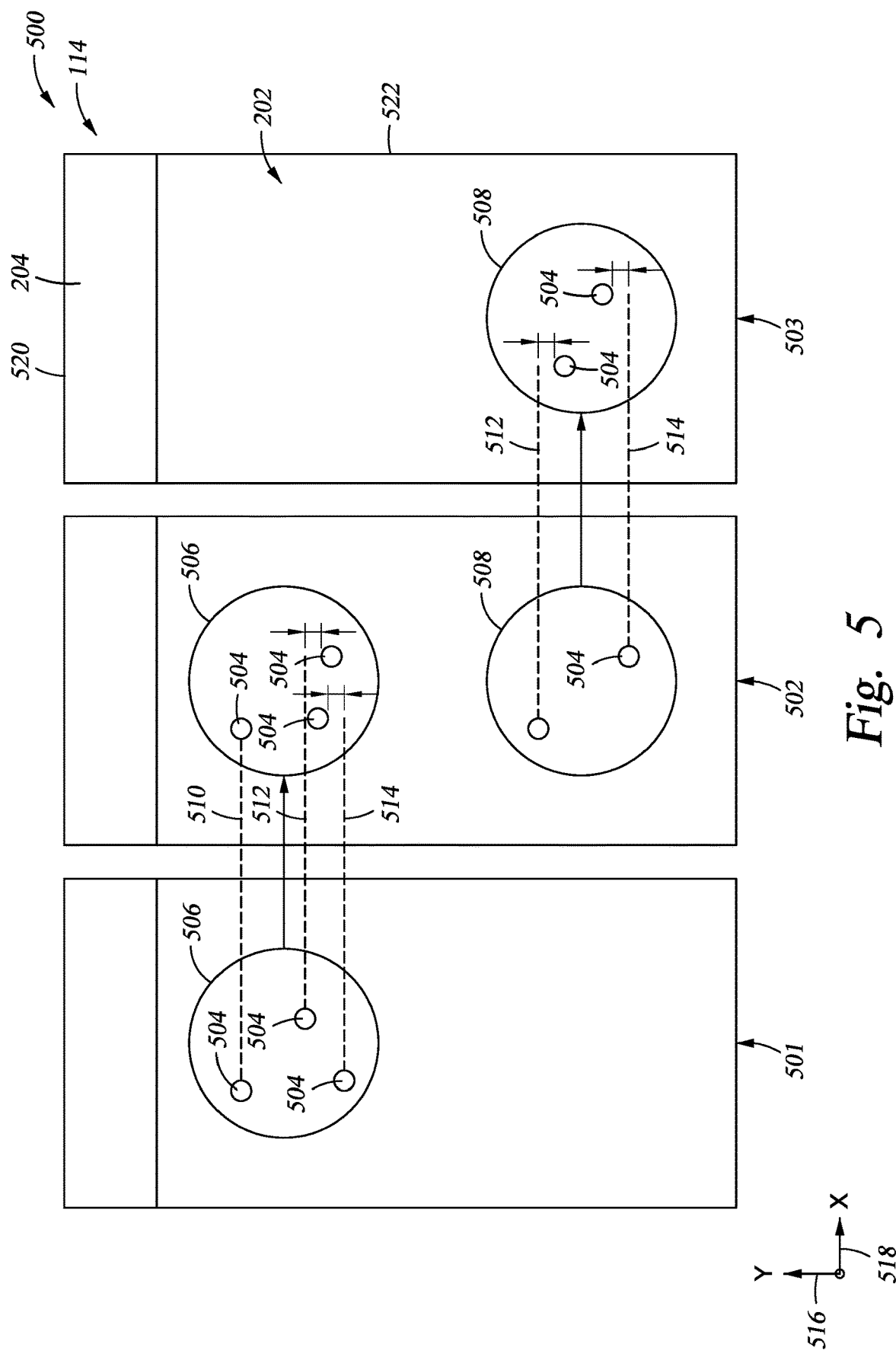
FIG. 5 is a schematic depiction of a plurality of images, according to embodiments described herein.

FIG. 5 is a schematic depiction of a plurality of images 500. The plurality of images 500 are captured by the one or more cameras 108 (shown in FIGS. 1 and 2) in the inspection zone 130 of the inspection system 100 (see FIG. 1). The plurality of images 500 correspond to images captured with the second pulsated illumination configuration 400, described above. As such, a first image 501 corresponds to a first frame 401, a second image 502 corresponds to a second frame 402, and a third image 503 corresponds to a third frame 403. Although only three images are shown in the plurality of images 500, the plurality of images 500 are not limited to three. The second pulsated illumination configuration 400 may be repeated subsequently to capture more than three images 500.

Each of the containers 114 includes a plurality of defects 504. The first image 501 is captured when a first pulse 404 (shown in FIG. 4) of light is provided. The first image 501 includes a first group 506 of the defects 504. The third image 503 is captured when a fourth pulse 407 (shown in FIG. 4) of light is provided. The third image 503 includes a second group 508 of the defects 504. The second image 502 is captured when a second pulse 405 and a third pulse 406 (shown in FIG. 4) of light are provided. The second image 502 includes the first group 506 and the second group 508 of the defects 504.

As the fluid 202 is rotating in the containers 114 due to rotation from the actuators 206 prior to capturing images of the fluid 202, the defects 504 are moving within the containers 114. As the first pulse 404 occurs in a second portion 424 of the exposure time 416 of the first frame 401 and the second pulse 405 occurs in a first portion 422 of the exposure time 416 of the second frame 402, the first group 506 of defects 504 are captured with the first image 501 and the subsequent second image 502. Additionally, as the third pulse 406 occurs in a second portion 424 of the exposure time 416 of the second frame 402 and the fourth pulse 407 occurs in the first portion 422 of the exposure time 416 of the third frame 403, the second group 508 of defects 504 are captured with the second image 502 and the subsequent third image 503.

By analyzing the images of the fluid containing different groups of defects 504 (e.g., the first group 506 and the second group 508), the defects 504 can be detected, identified, and categorized. As shown in FIG. 5, the defects 504 can be tracked and movement of each defect 504 may be observed. For example, a first tracking line 510, a second tracking line 512, and a third tracking line 514 each track a specific defect 504 in the first group 506 between the first image 501 and the second image 502. The defects 504 located in the fluid 202 will move in a horizontal direction 518 as a function of the induced rotation of the fluid 202. The horizontal direction 518 is parallel to a top surface 520 of each cap 204 on the containers 114. A vertical direction 516 is perpendicular to the top surface 520 of each cap 204 on the containers 114. In embodiments where the defect 504 does not move in the horizontal direction 518 and the vertical direction 516, the defect 504 is on an exterior surface 522 of the containers 114. For example, the defect may be a scratch or particle disposed on the exterior surface 522.

The second image 502 includes the first group 506 and the second group 508. The first group 506 is captured in the second image 502 from the second pulse 405. The second group 508 is captured in the second image 502 from the third pulse 406. The first group 506 and the second group 508 of the defects 504 are super-positioned on the second image 502. The first group 506 and the second group 508 in the second image 502 each have half the intensity as in the first image 501 and the third image 503 due to illumination being provided at an intermediate illumination level 418 (shown in FIG. 4). The second pulse 405 and the third pulse 406 of light allows for the camera 108 to capture both the first group 506 and the second group 508.

Capturing the plurality of images 500 according to the second pulsated illumination configuration 400 allows for the first group 506 and the second group 508 of the defects 504 to be captured without significant smearing of the defects 504 in the plurality of images 500. As the first pulse 404 and the second pulse 405 are provided subsequently and within subsequent portions of the adjacent exposure times 416 along the horizontal axis 412, the defects 504 avoid smearing in the plurality of images and remain present in a field of view of the camera 108. Similarly, as the third pulse 406 and the fourth pulse 407 are provided subsequently and within subsequent portions of the adjacent exposure times 416 along the horizontal axis 412, the defects 504 avoid smearing in the plurality of images and remain present in a field of view of the camera 108 between subsequent images 500.

The defect 504 corresponding to the first tracking line 510 remains stationary in the vertical direction 516. As such, the defect 504 corresponding to the first tracking line 510 may be identified and categorized as an exterior defect. Further, identifying the movement of the defects in the vertical direction 516 allows for proper identification of the defects 504. For example, the defects 504 may be identified as air bubbles or particles in the fluid 202. The defect 504 corresponding to the second tracking line 512 moves away from the cap 204 from the first image 501 to the second image 502. As such, the defect 504 corresponding to the second tracking line 512 may be identified and categorized as a particle defect. The defect 504 corresponding to the third tracking line 514 moves toward the cap 204 from the first image 501 to the second image 502. As such, the defect 504 corresponding to the third tracking line 514 may be identified and categorized as an air bubble (rises to the top of the container 114). Proper identification of the air bubbles improves the accuracy and precision of the fluid inspection process, as many air bubbles will disappear after a set period of time and are not detrimental to the quality of the fluid 202.

Figure 6:
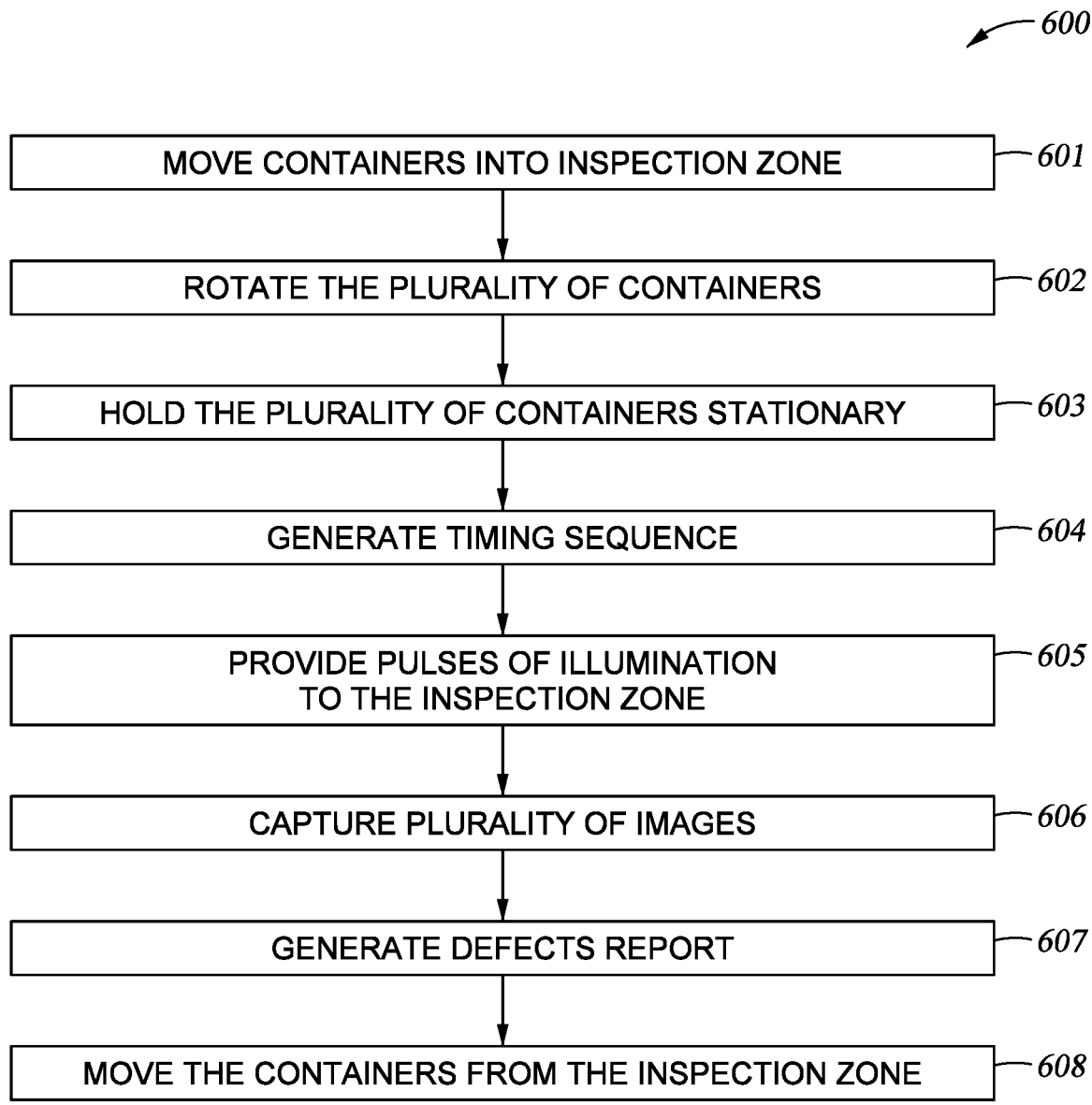
FIG. 6 is a flow diagram of a method of inspection of fluids for defects with an inspection system, according to embodiments described herein.

FIG. 6 is a flow diagram of a method 600 of inspection of fluids for defects with an inspection system 100. The method 600 may be performed utilizing the inspection system 100 shown in FIG. 1, or other suitable inspection systems. The method 600 may be performed with the first pulsated illumination configuration 300 or the second pulsated illumination configuration 400 for a timing sequence. The method 600 will be described in conjunction with FIG. 1 and FIG. 2. The method 600 is operable to inspect fluids for defects disposed in the fluids or the containers holding the fluids.

At operation 601, a plurality of containers 114 are positioned in a carrier 208 and moved into an inspection zone 130 of the inspection system 100. The carrier 208 is moved to the inspection zone 130 by the transportation system 126. Each of the plurality of containers 114 contains a fluid therein. The carrier 208 is configured to allow a plurality of actuators 206 to respectively engage each of the containers 114. Each of the plurality of containers 114 are positioned on or engaged with an actuator of the plurality of actuators 206. One or more cameras 108 of the inspection system 100 are directed to the plurality of containers 114 in the inspection zone 130. A sensor 128 detects the presence of the plurality of containers 114. The sensor 128 provided a trigger signal to the controller 106.

At operation 602, the plurality of containers 114 are rotated. A motor 132 engages with a rotation system 214. The rotation system 214 links together a plurality of actuators 206. The motor 132 provides power to the rotation system 214. The plurality of actuators 206 are rotated. The actuators 206 rotate the plurality of containers 114 disposed on the actuators 206. The actuators 206 rotate the plurality of containers 114 based on instructions received from the controller 106 or another controller. The instructions from the controller 106 provided to the motor 128 may be based on the trigger signal, signal from another sensor, or based on a timing sequence generated by the trigger timing generator 104 (as described at operation 604). While the containers 114 are rotated, defects separate from the fluid 202. The containers 114 may be rotated before entering the inspection zone 130, and/or when in the inspection zone 130. The actuators 206 are rotated at a rotation rate. For example, the rotation rate is about 6000 RPM.

At operation 603, the plurality of containers 114 stop rotating. The motor 132 disengages from the rotation system 214. The plurality of actuators 206 stop rotating. For a time after the plurality of containers 114 have stopped rotating, the fluid 202 therein continues to rotate within the containers 114. The controller 106 is operable to instruct the motor 132 to disengage. As the plurality of containers 114 remain stationary while the fluid continues to rotate, exterior defects will remain in the same location on the stationary container 114 while the fluid defects will rotate with the fluid.

At operation 604, a timing sequence is generated based on receipt of the trigger signal by the controller 106. The timing sequence is generated by a trigger timing generator 104. The timing sequence can correspond to the first pulsated illumination configuration 300 (shown in FIG. 3) or the second pulsated illumination configuration 400 (FIG. 4). The timing sequence is provided to the controller 106. The controller 106 executes a software routing based on the timing sequence to control the function and timing of the illuminators 110, 112 and the cameras 108 so that images may be captured of the rotated fluid 202 in the inspection zone 130.

At operation 605, pulses of light are provided by a reflection illuminator 110 and/or a transmission illuminator 112 to illuminate the containers of rotated fluid 202 in the inspection zone 130. Upon instruction from the controller 106, the pulses of light are provided according to the timing sequence. The reflection illuminator 110 and/or the transmission illuminator 112 are toggled from the "off" position to the "on" position according to the timing sequence. Each pulse is emitted at an illumination time 320, 426. The illumination time 320, 426 is less than an exposure time 316, 416 (see FIG. 3 and FIG. 4).

In some embodiments, the reflection illuminator 110 and/or the transmission illuminator 112 may be configured to emit visible light, while in other embodiments, different wavelengths may be emitted (e.g., ultraviolet, infrared). In other embodiments, which can be combined with other embodiments described herein, the reflection illuminator 110 and the transmission illuminator 112 may be configured to emit multiple wavelength. In one embodiment, which can be combined with other embodiments described herein, the transmission illuminator 112 emits red light. In another embodiment, which can be combined with other embodiments described herein, the reflection illuminator 110 emits blue light.

At operation 606, a plurality of images are captured by the at least one camera 108. The timing of the image capture is coordinated with the illumination of the fluid based on instructions from the controller 106. As such, the one or more cameras capture images of the containers 114 in the inspection zone 130 based on the timing sequence. Providing the pulses of light at the illumination time 320, 426 less than the exposure time 316, 416 allows for the cameras 108 to have high-resolution capability without smearing of the defects in the images. Because light is only provided to the cameras 108 during the pulses from the illuminators 110, 112, the images of the defects do not smear due to the illumination time 320, 426 being less than the exposure time 316, 416. The reflection illuminator 110 and/or the transmission illuminator 112 will emit ("on" position) the light during each frame. Each frame 301-303, 401-402 (see FIG. 3 and FIG. 4) includes at least one pulse of light. In some examples, to ensure groups of the defects are tracked in subsequent frames, pulses of light may occur at a second portion of the exposure time of a first frame followed by a pulse at a first portion of the exposure time. Therefore, the defects are captured with high-resolution images that allow for tracking of the defects from image to image without smearing.

Data-rate limits in cameras generally prevent using high-frame rate cameras with high-resolution capabilities. The one or more cameras 108 are low frame rate cameras with high-resolution capabilities. The low-frame rate of the cameras 108 (which generally will lead to smearing effects when capturing images of moving objects) is remedied with the use of the pulses of light (the objects in the images will only be seen in the images when the pulse of light is provided).

To ensure that the defects (which are moving within the containers 114, as a function of the rotation) are tracked from image to image, the pulses of light may be provided according to the second pulsated illumination configuration 400, as described above. The high-resolution capabilities which are able to be utilized as a function of the lower frame rate will improve identification and categorization of the defects in the images. The high-resolution images without smearing allow for identification of what the defect is. For example, dirt, glass, metals, or other particulates that float in the fluid 202 can be identified. Tracking the defects from image to image allows for classification of the defects. For example, a defect may be determined to be an interior defect (in the fluid 202) or an exterior defect (on the container 114). Further, the defects can be identified as air bubbles.

At operation 607, the plurality of images are processed in a computer system 116 to determine if defects are present. If defects are present, a defect report 118 is generated. The plurality of images are processed by the computer system 116 to compare the images to a library of images to determine if defects are present within the fluids of the containers 114. The plurality of images are processed with an image processing software. From the processed images, defects can be identified and categorized.

At operation 608, the plurality of containers 114 are moved from the inspection zone 130 by the transportation system 126. Another (i.e., second) set of containers 114 may be provided to the inspection zone 130 and the operations 602-607 may be repeated to inspect another batch of fluids.

In summation, a method and system for the inspection of fluids for defects is provided herein. A plurality of containers with fluids disposed therein are inspected for defects in an inspection system. A timing sequence is used to control the timing of light pulses directed to the fluid residing in the plurality of containers. A high-resolution camera is utilized to obtain images of the fluid disposed in the plurality of containers. The inspection system and method of utilizing the inspection system allows for high-resolution images of the fluid for enhanced detection of defects therein or defects on the containers itself.

While the foregoing is directed to embodiments of the present disclosure, other and further embodiments of the disclosure may be devised without departing from the basic scope thereof, and the scope thereof is determined by the claims that follow.

What is claimed is:

1. A fluid inspection system, comprising:
    a transportation system, wherein the transportation system is configured to move a carrier in a first direction through an inspection zone, wherein a plurality of containers of fluid is disposed in a row in the first direction on the carrier;
    at least one illuminator directed to the inspection zone;
    one or more cameras positioned in a camera row in the first direction and directed to the inspection zone in a second direction;
    one or more actuators disposed proximate to the inspection zone and operable to rotate the plurality of containers of fluid such that the fluid within the containers remains rotating for at least a portion of time the containers are in inspection zone; and
    a controller in communication with the at least one illuminator and the one or more cameras, wherein the controller is configured to:
        cause the transportation system to move the carrier, on which the plurality of containers of fluid is disposed, into the inspection zone;
        cause the one or more actuators to rotate the plurality of containers of fluid;
        cause the one or more actuators to stop rotating the plurality of containers of fluid;
        cause the at least one illuminator to emit pulses of light to the inspection zone according to a timing sequence comprising a plurality of frames of the one or more cameras, wherein at least two of the plurality of frames include a different number of pulses of light, a different illumination level of pulses of light, and a varying time between adjacent pulses of light;
        cause the one or more cameras to capture a plurality of images of fluid rotating in the plurality of containers disposed in the inspection zone; and
        cause the transportation system to move the carrier, on which the plurality of containers of fluid is disposed, out of the inspection zone,
        wherein an illumination time of the pulses of light is less than an exposure time of each frame of the one or more cameras.

2. The fluid inspection system of claim 1, wherein the at least one illuminator is at least one or both of:
    a transmission illuminator; and
    a reflection illuminator.

3. The fluid inspection system of claim 1, wherein the transportation system is one of a conveyor, a carousel, a robot, or a pallet system.

4. The fluid inspection system of claim 1, wherein the plurality of containers are selected from the group consisting of vials, ampules, cartridges, and pre-filled syringes.

5. The fluid inspection system of claim 1, wherein the one or more cameras are high-resolution cameras, wherein each of the cameras has a greater than about 20 MP.

6. The fluid inspection system of claim 1, wherein each of the one or more cameras has a frame rate between about 10 FPS and about 15 FPS.

7. The fluid inspection system of claim 1, wherein the plurality of images are used to identify defects in the fluid, the identifying the defects including sending the plurality of images to a computer system to process the plurality of images with image processing software to identify the defects in the fluid.

8. A method of inspecting fluid, comprising:
    moving a carrier in a first direction through an inspection zone of an inspection system, wherein a plurality of containers containing fluid is disposed in a row in the first direction on the carrier;
    rotating the plurality of containers;
    stopping the rotation of the plurality of containers;
    emitting pulses of light to the inspection zone according to a timing sequence comprising a plurality of frames of one or more cameras, wherein at least two of the plurality of frames include a different number of pulses of light, a different illumination level of pulses of light, and a varying time between adjacent pulses of light;
    capturing a plurality of images, of the plurality of containers that have stopped rotating having fluid therein continuing to rotate, with the one or more cameras disposed in a camera row in the first direction and directed to the inspection zone in a second direction; and
    moving the carrier in the first direction, on which the plurality of containers containing fluid is disposed, out of the inspection zone of the inspection system, wherein an illumination time of pulses of light in the inspection zone is less than an exposure time of each frame of a plurality of frames of the one or more cameras.

9. The method of claim 8, wherein the pulses of light are provided according to a timing sequence, wherein the timing sequence coordinates the pulses of light with the capturing of the plurality of images.

10. The method of claim 9, wherein the timing sequence includes the pulses of light provided subsequently at equal intervals in each frame of the plurality of frames of the one or more cameras.

11. The method of claim 10, wherein the pulses of light are provided at a maximum illumination level.

12. The method of claim 9, wherein the plurality of frames includes a first frame, a second frame subsequent the first frame, and a third frame subsequent the second frame, and wherein the exposure time of each frame is divided into a first portion and a second portion subsequent the first portion such that each frame includes one or more of the pulses of light.

13. The method of claim 12, wherein the timing sequence includes the first frame including the pulse of light in the second portion, the second frame including the pulse of light in the first portion and the second portion, and the third frame including the pulse of light in the first portion.

14. The method of claim 13, wherein the pulses of light in the second frame are provided at an intermediate illumination level and the pulses of light in the first frame and the third frame are provided at a maximum illumination level.

15. The method of claim 8, further comprising identifying defects in the fluid, the identifying the defects including sending the plurality of images to a computer system, the computer system processing the plurality of images with image processing software to identify the defects in the fluid.

16. The method of claim 15, further comprising identifying if each defect of the defects in the fluid is an exterior defect or an interior defect, wherein the exterior defects remain stationary in subsequent image of the plurality of images and the exterior defects move in subsequent image of the plurality of images.

17. The method of claim 8, wherein the plurality of containers are coupled to a plurality of actuators configured to rotate the plurality of containers when a motor is engaged with a rotation system, the rotation system linking the plurality of actuators together such that the plurality of actuators are rotated at a same rate.

18. A non-transitory computer-readable medium storing instructions that, when executed by a processor coupled to an inspection system, cause the inspection system to:
- move a carrier in a first direction through an inspection zone of an inspection system, wherein a plurality of containers containing fluid is disposed in a row in the first direction on the carrier;
- rotate the plurality of containers;
- stop the rotation of the plurality of containers;
- emit pulses of light to the inspect zone according to a timing sequence comprising a plurality of frames of one or more cameras, wherein at least two of the plurality of frames include a different number of pulses of light, a different illumination level of pulses of light, and a varying time between adjacent pulses of light;
- capture a plurality of images, of the plurality of containers that have stopped rotating having fluid therein continuing to rotate, with the one or more cameras disposed in a camera row in the first direction and directed to the inspection zone in a second direction, while in the inspection zone; and
- move the carrier in the first direction, on which the plurality of containers containing fluid is disposed, out of the inspection zone of the inspection system,
wherein an illumination time of pulses of light in the inspection zone is less than an exposure time of each frame of a plurality of frames of the one or more cameras.

19. The non-transitory computer-readable medium of claim 18, wherein the pulses of light are provided according to a timing sequence, wherein the timing sequence coordinates the pulses of light with the capturing of the plurality of images.

* * * * *